US011907646B1

(12) United States Patent
Garg et al.

(10) Patent No.: US 11,907,646 B1
(45) Date of Patent: Feb. 20, 2024

(54) HTML ELEMENT BASED RENDERING SUPPORTING INTERACTIVE OBJECTS

(71) Applicant: Adobe Inc., San Jose, CA (US)

(72) Inventors: Tarun Garg, New Delhi (IN); Kerri Shotts, North East, MD (US); Aditya Vikram, Udaipur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/165,522

(22) Filed: Feb. 7, 2023

(51) Int. Cl.
*G06F 40/143* (2020.01)
*G06F 40/154* (2020.01)
*G06F 9/451* (2018.01)
*G06F 16/958* (2019.01)

(52) U.S. Cl.
CPC ............ *G06F 40/143* (2020.01); *G06F 9/451* (2018.02); *G06F 16/986* (2019.01); *G06F 40/154* (2020.01)

(58) Field of Classification Search
CPC ...... G06F 40/143; G06F 9/451; G06F 16/986; G06F 40/154
See application file for complete search history.

(56) References Cited

U.S. PATENT DOCUMENTS

| | | | |
|---|---|---|---|
| 8,112,473 B2* | 2/2012 | Saillet | G06F 16/95 715/240 |
| 11,489,845 B1* | 11/2022 | Feng | G06F 9/451 |
| 2006/0224976 A1* | 10/2006 | Albrecht | G06F 9/451 715/760 |
| 2007/0256003 A1* | 11/2007 | Wagoner | G06F 16/958 707/E17.116 |
| 2008/0195936 A1* | 8/2008 | White | G06F 9/451 715/764 |
| 2013/0046855 A1* | 2/2013 | Jiang | H04L 67/10 709/218 |
| 2013/0227394 A1* | 8/2013 | Sazhin | G06F 40/166 715/234 |
| 2018/0176319 A1* | 6/2018 | Herlitz | G06F 40/143 |

* cited by examiner

*Primary Examiner* — Keith D Bloomquist
(74) *Attorney, Agent, or Firm* — Nicholson De Vos Webster & Elliott LLP

(57) ABSTRACT

A method includes receiving a user event associated with content of an add-on for a web application displayed on a first user interface. The add-on is a non-native application executed using a hypertext markup language (HTML) element. The method further includes passing the user event to a document object model of the web application using a blank native element. The blank native element links the add-on to the document object model. The method further includes processing the user event using an HTML element renderer. The method further includes displaying updated content associated with the add-on based on the processed user event.

20 Claims, 11 Drawing Sheets

US 11,907,646 B1

HTML ELEMENT BASED RENDERING SUPPORTING INTERACTIVE OBJECTS

BACKGROUND

An add-on, is a third-party software program that extends the functionality of a web application (otherwise referred to herein as a native application). Generally, add-ons are executed using their own set of application program interfaces (APIs). An API communicates with a server storing executable code (e.g., functions), add-on data, and the like, using API calls (or API requests). In response to the API call, the API receives such add-on data or services from the server and provides functionality, services, and/or data to whatever system initiated the API call. Because add-ons are isolated from the native application (in terms of functionality, servicing content, storage, etc.) lag is introduced in the execution of the add-on as compared to the execution of a web application.

SUMMARY

Introduced here are techniques/technologies that support an add-on in a document object model that is rendered using an HTML element such as an iframe. Add-ons extend the functionality of the native web application by supporting third-party code. The security of the native web application is not compromised by running the third-party code because the HTML element executing the third-party code isolates or "sandboxes" the third-party code from the code of the native application. Isolating the add-on from the web application is reflected in the execution of the code of the add-on, the storage of objects of the add-on, and rendering the content of the add-on.

When the add-on is executed, a blank native element provided by the native web application links an HTML element executing the add-on to the web application document object model (DOM). Specifically, user events such as mouse clicks associated with the add-on are passed through components of the native web application and subsequently stored in an object of the DOM. In this manner, contents and/or attributes of the HTML element (and the executed add-on) are incorporated into the DOM. By executing the add-on using an HTML element linked to the blank native element, the add-on is a new type of element that is part of the DOM itself.

A web application platform synchronizes the DOM across instances of the web application executed on different computing devices. In this manner, the attributes of the add-on, the content of the add-on, and the like, are synchronized across instances of the web application. Further, the DOM's management of both add-on content and native application content provides a seamless end-user experience. For example, an end-user views and interacts with add-on content and native web application similarly.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a web application that supports add-ons in a DOM (e.g., the web application DOM). The add-ons are rendered using HTML elements such as iframes. In one conventional approach, third party developers create add-ons using an API of a web application. However, developers are limited to the language of the web application (e.g., a domain specific language) when the developers use the API of the web application. For example, developers are limited to creating the add-on using the language, libraries, and other functions of the native application. The restriction of the third-party developers to the web application prevents developers from using well-known programming language, libraries, and/or previously written code.

Moreover, there is noticeable lag experienced by an end user using add-ons of the web application rendered using the API, as is accomplished during conventional systems. The increased lag is a result of executing the add-on at a server using a third-party engine, as opposed to running the add-on in real time through the web browser. The execution of the third-party code in the third-party engine at the server, while secure, is less secure than isolating the third party code entirely.

To address these and other deficiencies, a new native element is defined in the DOM to represent an add-on and which does not include its own renderable content. In effect, an HTML component "invisible" to an end user collects user interactions associated with an add-on implemented using an HTML element (such as an iframe). The HTML component provides the user interactions to an "invisible" native element that links the add-on to the web application DOM. In this manner, the web application DOM is able to support third party code and/or user interactions associated with the add-on. As a result, interactive objects of the add-on are supported by the web browser.

Using an HTML element such as an iframe to implement the add-on provides increased security. Iframes act as a "sandbox" that isolates the code of the add-on from the code of a native application. Additionally, executing add-ons using HTML elements improves rendering time and responsiveness of the add-on, as compared to prior approaches which require executing add-ons using an engine located on a server.

Figure 1:
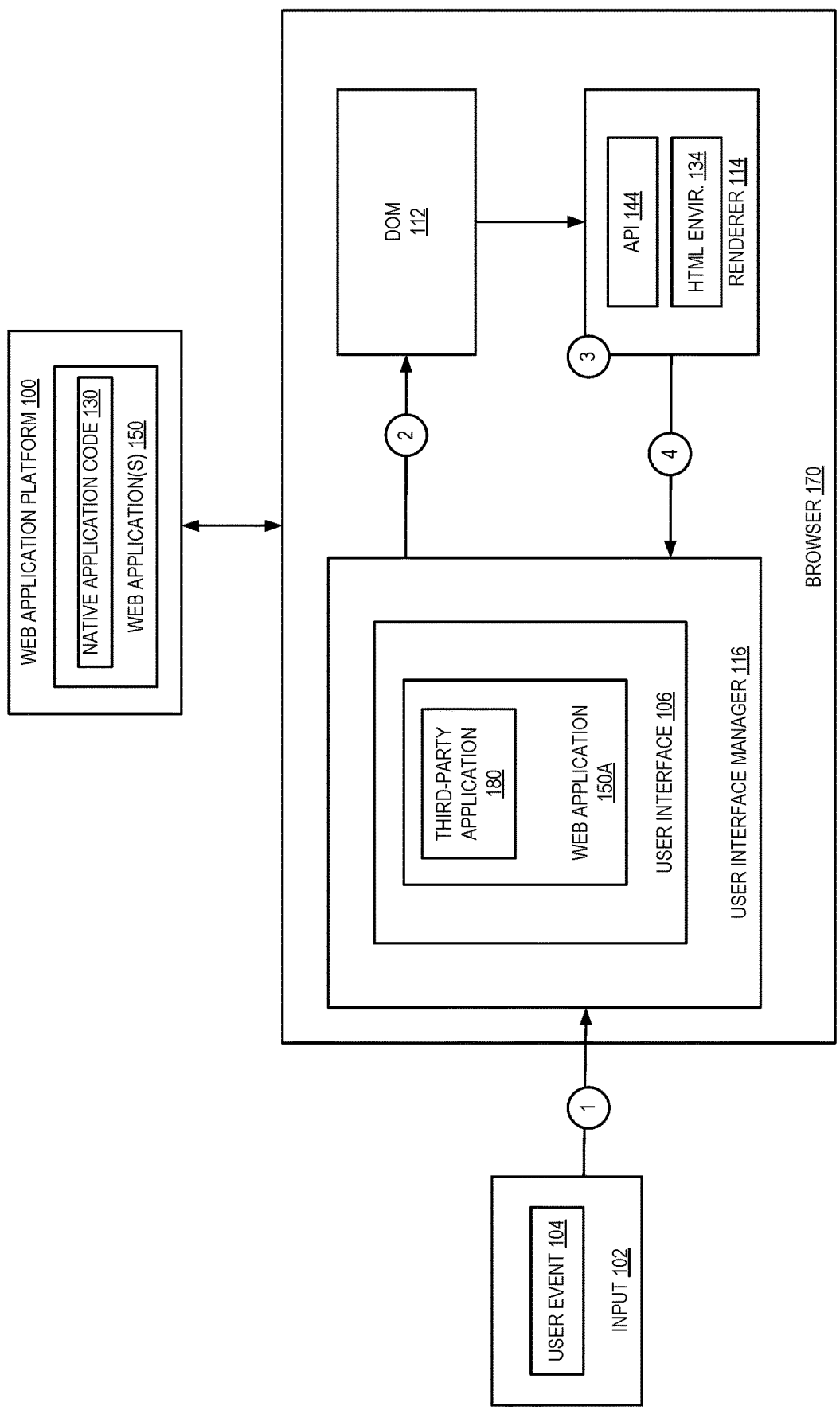
FIG. 1 illustrates a diagram of a process of executing a web application, in accordance with one or more embodiments.

FIG. 1 illustrates a diagram of a process of executing a web application, in accordance with one or more embodiments. As shown in FIG. 1, embodiments include a browser 170 and a web application platform 100.

The web application platform 100 includes software executed to automate processes, synchronize services, and/or provide integration capability for different devices (e.g., cellular devices, desktop devices, laptop devices, or other computing devices generally). The web application platform 100 manages one or more web applications 150 (such as web application 150A) that may be synchronized and executed on different devices.

The web application 150 (including web application 150A) is an application responsible for a specific functionality such as a drawing application, an image editing application, or other digital design applications. Such web applications may provide a digital canvas, which is a digital workspace displayed to an end user in which the user may perform the one or more functions of the web application. The functionalities of the web application 150 are executable using native application code 130. Functionalities of the web applications 150 include, but are not limited to, designing/arranging layouts, drawings shapes, and writing text on the digital canvas.

One mechanism of executing web applications 150 involves using web browser 170. For example, the browser 170 requests application data from the web application platform 100 to execute one or more functionalities of the web application 150. Application data can include Hypertext Markup Language (HTML) descriptions of the content to be rendered on the application (and specifically, a web page of the application). Additionally, application data can include cascading style sheet (CSS) information. Such CSS information dictates the layout/structure of the HTML data. Further, application data can include Javascript data, which enables dynamic content of the web application. The retrieved application data is organized using a DOM such that the browser 170 can render one or more portions of the application data.

As described herein, browser 170 may also be used to execute third-party application 180. For example, an HTML element such as an inline frame (iframe) is used to run code (such as third-party code associated with third-party application 180) within the web application 150A. It should be appreciated that while the present disclosure describes iframes specifically, the methods and processes described herein apply to HTML elements generally. The iframe can run HTML code, javascript code, CSS code, and the like.

As shown at numeral 1, a browser 170 receives an input 102. Input 102 is a mouse click, a mouse hover, a mouse compression, a mouse decompression, a haptic interaction, a key press, and the like. The input 102 is representative of a user event 104 (also referred to herein as user interactions) associated with content displayed on the user interface 106. For example, user events 104 include selecting content, navigating around the content (e.g., scrolling left, right, up, or down around a page of a web application), resizing content (e.g., zooming in/zooming out), adding content, deleting content, adjusting properties of content, etc.

At numeral 2, the user interface manager 116 provides the input 102 to the DOM 112. The DOM 112 is browser's 170 representation of the web application 150A, indicated using a hierarchy of objects. For example, the DOM 112 manages HTML data (descriptions of the content to be rendered on the application), CSS information (a layout/structure of the HTML data), and/or javascript data (dynamic content of the web application). Each element of web application 150A (coded in HTML, CSS and/or Javascript in the native application code 130) is an object of the DOM 112. Similarly, properties and/or content associated with the third-party application 180 is stored as an object of the DOM. To obtain properties (or content) of an object stored in the DOM (or otherwise interact with the object), the browser traverses 170 the DOM 112 until the browser 170 arrives at the object.

Browsers are used to render content to display text, designs, shapes, colors, and the like to an end user via user interface 106. At numeral 3, the renderer 114 renders content of the web application 150A. Rendering web application 150A is generally supported by a web graphics library (WebGL). The WebGL library is a javascript API (e.g., API 144) that renders interactive two-dimensional and/or three-dimensional graphics within a browser 170. However, any content of the third-party application is rendered using HTML environment 134. As described herein, when the third-party application 180 is executed, the browser 170 creates an HTML environment 134 to render the content of the HTML element running the third-party code 110 (e.g., the iframe). In this manner, the browser 170 acts as an HTML renderer (or specifically an iframe renderer). That is, the renderer 114 renders native objects using WebGL, and renders the add-on content executed using the iframe, via the browser (e.g., using the HTML environment).

Although native objects are rendered using WebGL, and iframes are rendered using HTML constructs, both native objects and iframes behave similarly, from the end user's perspective, if the iframe is supported in the DOM. For example, a user may move, resize, and/or interact with a native object. Similarly, a user may move, resize, and/or interact with non-native objects executed using iframes. This behavioral similarity is attributed to the DOM's management of both non-native objects and native objects and provides a seamless user experience. For example, a user may click on a non-native object or a native object and obtain properties of the object because the DOM stores properties of both types of objects.

At numeral 4, rendered portions of application data (e.g., either the web application data and/or the third-party application data) are displayed, using the browser 170, to the end user via the user interface 106. For example, the user interface 106 may display a digital canvas of the web application 150A and one or more interactive objects of the third-party application 180. Specifically, the user interface manager 116 receives the rendered portions of application data and arranges the application data for display via the user interface 106.

Figure 2:
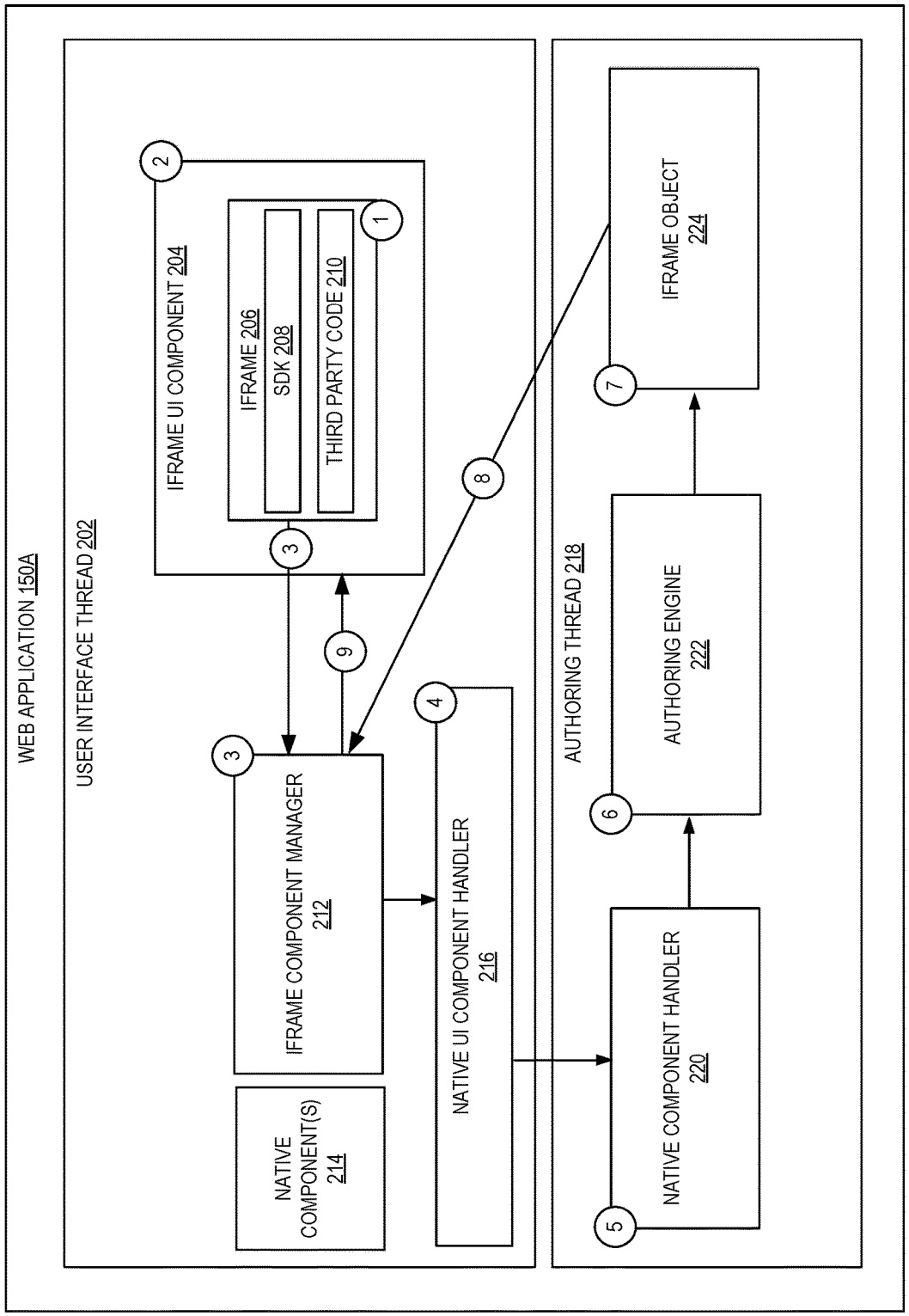
FIG. 2 illustrates a diagram of a process of deploying a web application supporting interactive objects in a document object model that are rendered using HTML elements, in accordance with one or more embodiments.

FIG. 2 illustrates a diagram of a process of deploying a web application supporting interactive objects in a document object model that are rendered using HTML elements, in accordance with one or more embodiments. The web application 150A operates using a user interface thread 202 and an authoring thread 118. Generally, threads are paths of execution. For example, the user interface thread 202 manages and processes such instructions and operations associated with a user interface. The authoring thread 118 manages and processes such instructions and operations associated with the creation and execution of a web application. All of the processing in a DOM occurs in the authoring thread 118.

A user operating a computing device initiates a web application 150A executed using web application platform 100. For example, the user initiates the web application 150A by visiting a URL or other endpoint associated with the web application. In some embodiments, the user may be authenticated and/or authorized upon attempting to access the web application. As described herein, responsive to the initiated web application 150A, a browser requests application data from a server hosting web application platform. Such application data is delivered to the browser via the internet. Application data can include HTML descriptions of the content to be rendered on the application (and specifically, a web page of the application). Additionally, application data can include CSS information. Such CSS information dictates the layout/structure of the HTML data. Further, application data can include javascript data, which enables dynamic content of the web application. The retrieved application data is organized using a DOM such that the browser can render one or more portions of the application data.

The browser displays the web application to the user via the computing device. An example of a displayed web application is described with reference to FIGS. 3A-3B. The user may initiate an add-on of the web application by interacting with a control panel. For example, a user may drag (or otherwise select) the add-on from a control panel of the web application. Examples of add-ons include timers, polls, embedded images, embedded videos, interactive games, maps, and the like.

Responsive to dragging an add-on to the digital canvas, selecting an add-on application from a list of add-ons, and the like, an HTML element such as iframe 206 is created by the web application using HTML at numeral 1. As described herein, the iframe 206 runs a script to execute functionality of the add-on in the web application 150A. Each iframe corresponds to a non-native application that is isolated from the native application.

Isolating the non-native application from the native application limits the access of the non-native application by "sandboxing" the non-native application from the native application. For example, non-native applications are executed using an HTML element such as an iframe, while native applications are executed by the browser directly. Moreover, objects of the non-native application are stored separately in the DOM from objects of native applications (e.g., iframe object 224). Lastly, the non-native application content is rendered using the browser (e.g., in an HTML environment) while the native application content is rendered using WebGL.

In some embodiments, for each add-on (or non-native application), there is a unique iframe. For example, there may be N iframes 206 each running a unique third-party code 210A . . . 210N and including the software development kit (SDK) 208.

A SDK 208 includes a library (or other calls) that allow the third-party application to be displayed using the web application. Specifically, the SDK 208 gives third-party developers access to HTML elements such as an iframe that are utilized to execute the third-party code 210.

The third-party code 210 includes third-party logic supporting the additional functionality provided by the third-party application to the web application. The third-party code 210 may be written in HTML, CSS and/or Javascript, and include third-party specific libraries, functions, and the like. In this manner, third party developers can reuse previously written code.

Each time an iframe 206 is created to support the execution of the third-party code 210, a counter object (e.g., iframe object 224) is created in the DOM of the web application. That is, iframe object 224 is allocated in the DOM for each iframe 206 associated with a non-native application.

At numeral 2, the iframe UI component 204 collects events associated with the iframe 206, determines a position (and/or orientation) of the iframe 206 in the digital canvas, and the like. In operation, the iframe UI component 204 is a container for each iframe 206 of the web application. The iframe UI component 204 listens for events associated with one or more executed iframes 206 because the iframe 206 is an HTML element above the digital canvas. As a result, the native UI component handler 216 does not detect events associated with the digital canvas executed via the iframe. That is, the native UI component handler 216 is not aware of events associated with the iframe 206. Therefore, the iframe UI component 204 is configured to recognize events associated with an iframe 206. The events detected by the iframe UI component 204 may be user events, such as a mouse click, a mouse hover, a mouse compression, a mouse decompression, a haptic interaction, a key press, and the like. Additionally or alternatively, events detected by the iframe UI component 204 may be non-user events such as an event associated with a timer, a completion of a system (or user) task, one or more internal alarms, etc.

At numeral 3, the iframe UI component 204 passes the events associated with the iframe 206 to the iframe component manager 212. The iframe component manager 212 is a native object of the web application (sometimes referred to herein as a blank native element) that is not rendered. In effect, it is an invisible space in the web application that is allocated to one or more iframes 206 (e.g., a specific non-native application). The iframe component manager 212 is a native object of the web application that links an iframe 206 to the DOM of the web application.

Data collected by the iframe UI component 204 is used to map (or otherwise correlate) a position of the iframe 206 in the user interface to the web application using the iframe component manager 212. For example, the iframe UI component 204 facilitates mapping a position of the iframe 206 on the web application to a position on the web application. Specifically, the iframe component manager 212 passes coordinates of the position of the iframe 206 obtained from the iframe UI component 204 to the iframe object 224 of the DOM (using the native UI component handler 216, the native component handler 220, and the authoring engine 222). Using the coordinates of the position of the iframe 206 stored in the iframe object 224, the DOM becomes aware of the position of the iframe 206 in the web application.

In some embodiments, each iframe 206 is associated with a corresponding iframe component manager 212. In other embodiments, a single iframe component manager 212 manages multiple iframes 206 by passing user event information associated with each iframe 206 to the native UI component handler 216.

In some embodiments, also at numeral 3, the APIs of the SDK 208 pass non-native application content to the iframe component manger 212. For example, a state of the add-on is passed to the iframe component manager 212.

At numeral 4, the native UI component handler 216 receives event information (or other information such as state information) associated with the iframe 206. Generally, the native UI component handler 216 manages events by passing such events to the native component handler 220 in the authoring thread 218. In some embodiments, the native UI component may identify (and/or execute) one or more routines responsive to collected data (e.g., a user event such as a mouse click). That is, the native UI component handler 216 may identify (and/or execute) a defined behavior for the received event data associated with the iframe 206.

At numeral 5, the native UI component handler 216 passes the collected data, including events, non-native content, and, in some cases, one or more identifiers of a routine to be executed, to a native component handler 220. Generally, the native component handler 220 listens to event data received from the native UI component handler 216 in the user interface thread 202. In some embodiments, the native component handler 220 may identify additional behaviors responsive to the collected data. For example, the native component handler 220 may update the DOM responsive to the received data from the native UI component handler 216.

At numeral 6, the native component handler 220 passes the event data (and any additional routines/behaviors, non-native content, etc.) to the authoring engine 222 for execution of the routines (or defined behavior). In some embodiments, the authoring engine 222 updates the web application DOM. For example, executing a non-native application and/or modifying one or more attributes of a non-native application result in updates to the iframe object 224 of the web application DOM. At numeral 7, the iframe object 224 is updated (e.g., by the authoring engine 222) based on the executed routine. The iframe object 224 is a global data object of the DOM that describes the iframe 206 including content of the iframe, attributes of the iframe (color, position, orientation, opacity, etc.), and the like. Each iframe 206 executed corresponds to an iframe object 224.

In an example, a user event may adjust a property of the iframe 206 (e.g., the size of the iframe). Accordingly, the iframe object 224 stores and maintains such adjustments to the property. Similarly, content of the iframe 206 may be adjusted (e.g., a timer add-on is initiated, a turn in an interactive game is played, etc.). Accordingly, the iframe object 224 stores and maintains content associated with the iframe 206. For example, the iframe object 224 may store a flag indicating that the timer add-on is initiated, a counter value of the timer add-on, etc.

After one or more properties of the iframe object 224 have been adjusted, and/or content of the iframe object 224 has been updated, the iframe object 224 passes the adjustments, as CSS transformations (or other transformations), to the iframe component manager 212 at numeral 8. As described herein, CSS is used to adjust the layout/structure of objects of an application. Therefore, as a result of a user event, CSS transforms representing stylistic modifications (or other visual modifications) are applied to the iframe 206. For example, a user zooming in on a timer application would result in the size of the timer being increased. Such resizing may be defined according to CSS transforms based on the user event (the user zooming in on the timer application).

As described herein, the iframe component manager 212 links the iframe 206 displayed on the web application to the DOM of the web application. Accordingly, at numeral 9, the iframe component manager 212 passes such CSS transformations (or other transformations) received from the DOM to the iframe UI component 204 (and/or the iframe 206) to translate one or more properties of the iframe. In this manner, transformations from the DOM are passed to the iframe 206. In particular, CSS transforms are applied to the iframe 206 via the iframe component manager 212. Accordingly, such adjusted iframe properties and/or iframe content is displayed to a user via the iframe 206.

Figure 3A:
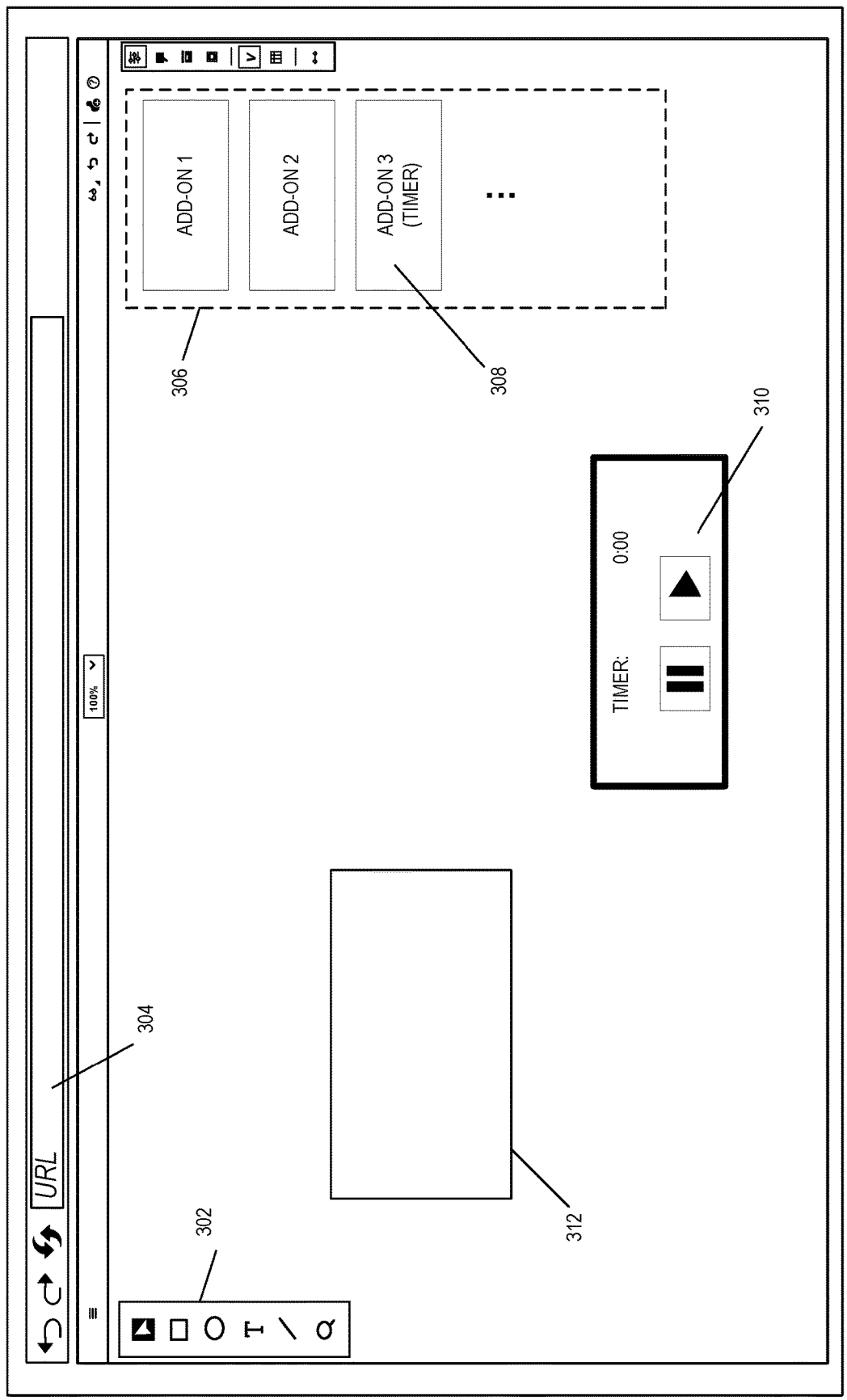
FIGS. 3A-3B illustrate an example execution of a web application and the rendering of a non-native application on a digital canvas of the web application, in accordance with one or more embodiments.
Figure 3B:
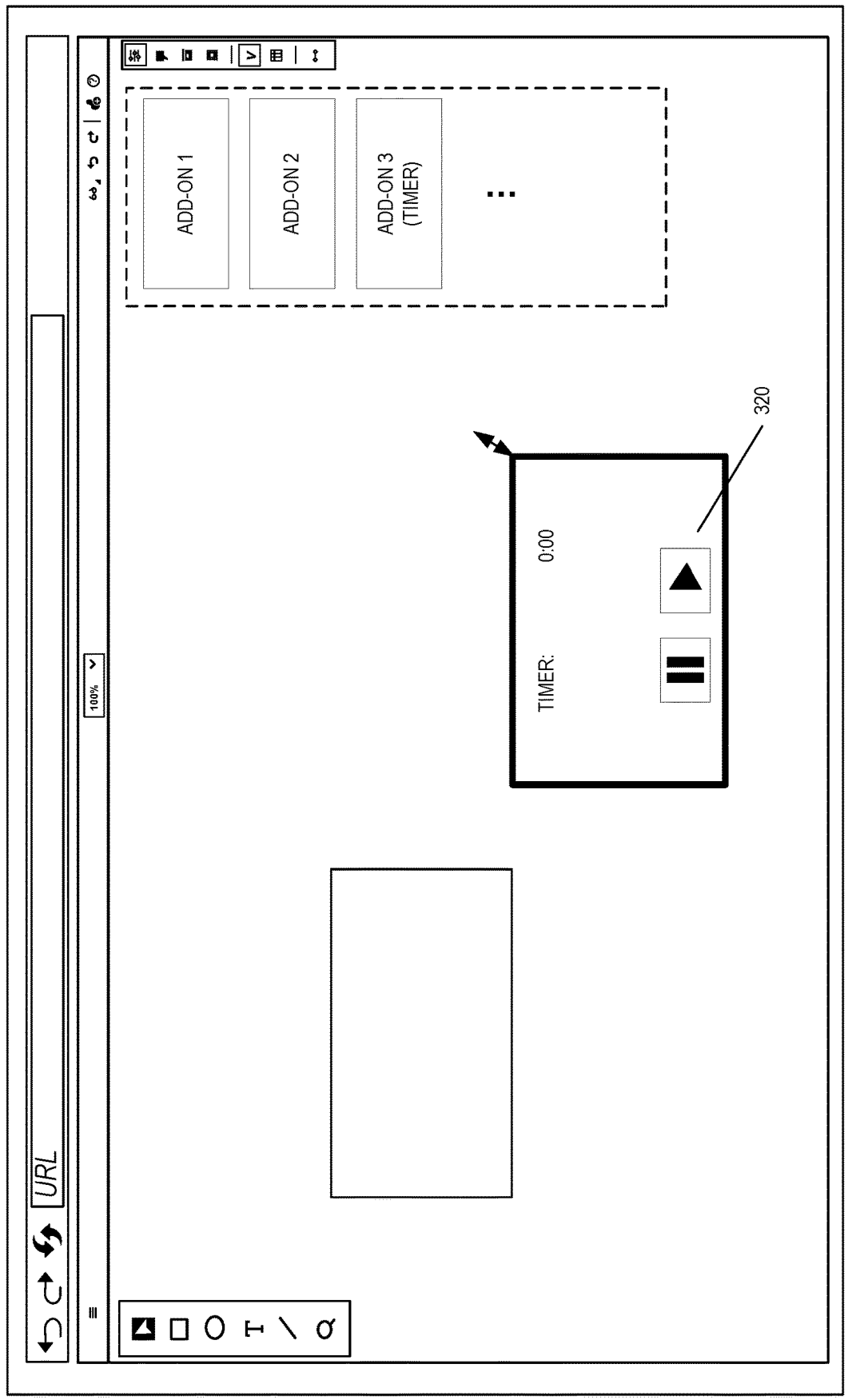

FIGS. 3A-3B illustrate an example execution of a web application and the rendering of a non-native application on a digital canvas of the web application, in accordance with one or more embodiments. As shown, the native application \ is running on a browser 304. The native application includes native functions indicated at 302. Native functions can include cropping an image, sampling a color, adding text, adding a shape, and the like. An example native object (e.g., a square) is illustrated by object 312.

A control panel including non-native functions (e.g., add-ons) is indicated by 306. The control panel can display add-ons using names, images, other descriptors, or some combination. In some embodiments, add-ons in the control panel may display a most recent version of the add-on, a name of the developer of the add-on, a date of last update of the add-on, and the like. A user may select an add-on from the control panel, drag an add-on from the control panel onto the digital canvas, and the like. In some embodiments, the user may select a number of add-ons displayed in the control panel.

In some implementations, the control panel is an add-on store (or other add-on marketplace) that identifies add-ons executable by the native application. The add-ons from the add-on store may be free or purchased, depending on a setting determined by the developers of the add-on.

As shown in FIG. 3A, a user has selected add-on 308 and dragged the add-on into the digital canvas to create the non-native object 310 (e.g., a timer). The non-native object 310 may be placed anywhere in the canvas. As described herein, the square native object 312 is rendered using WebGL, and the timer non-native object 310 is executed using an iframe and rendered using an HTML environment, both native object 312 and non-native object 310 behave similarly, from the end user's perspective, if the iframe is supported in the DOM. For example, the non-native object 310 may be resized and displayed. FIG. 3B illustrates the resized non-native object 320 displayed on the digital canvas. For example, a cursor may stretch the non-native object 310, resulting in non-native object 320. The ability to resize the non-native object 310 just as the end user would resize the native object 312 is attributed to the DOM's management of both non-native objects and native objects.

Figure 4:
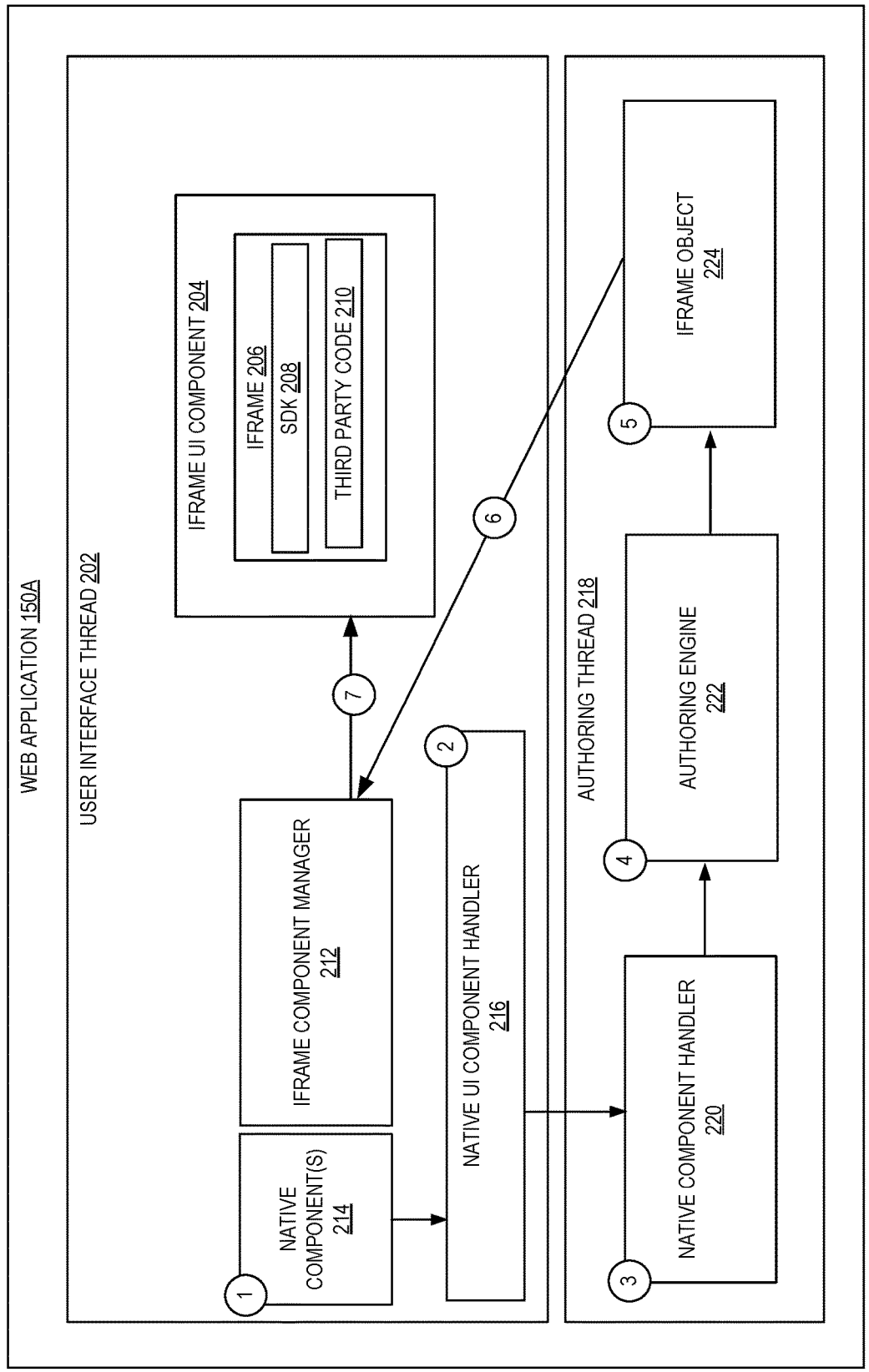
FIG. 4 illustrates a diagram of a process of manipulating interactive objects in a document object model that are rendered using HTML elements, in accordance with one or more embodiments.

FIG. 4 illustrates a diagram of a process of manipulating interactive objects in a document object model that are rendered using HTML elements, in accordance with one or more embodiments. At numeral 1, an event is received corresponding to a native component 214 of the web application. For example, the event may be a user event corresponding to a user navigating around the web application (e.g., scrolling down the displayed digital canvas of the web application). Such navigation around the web application includes clicking (or otherwise interacting with) native components 214 of the web application. For example, native components 214 can be a scroll bar, a zoom in button, a zoom out button, etc.

At numeral 2, the native UI component handler 216 collects the event associated with native components 214. As described herein, the native UI component handler 216 may identify (and/or execute) a defined behavior for the received event data.

At numeral 3, the native UI component handler 216 passes the collected data (and, in some cases, one or more identifiers of a routine to be executed) to a native component handler 220. The native component handler 220 generally listens to event data received from the native UI component handler 216 in the user interface thread 202. In some embodiments, the native component handler 220 may identify additional behaviors responsive to the collected data. For example, the native component handler 220 may update the DOM responsive to the received data from the native UI component handler 216.

At numeral 4, the native component handler 220 passes the event data (and any additional routines/behaviors) to the authoring engine 222 for execution of the routines (or defined behavior). In some embodiments, the authoring engine 222 updates the web application DOM. For example, executing a non-native application and/or modifying one or more attributes of a non-native application (directly via a user interaction/event or indirectly) result in updates to the iframe object 224 of the web application DOM. Responsive to the updates (e.g., the web application DOM, the iframe object 224, executed routines, etc.) the displayed web application presented to the user may be adjusted. For instance, the digital canvas of the web application may be zoomed in, the digital canvas of the web application may be shifted in a direction corresponding to a user scrolling in a direction, objects of the digital canvas may be added/deleted (shapes, borders, colors, etc.).

If an add-on is operating in the web-application, the add-on may be adjusted based on the event associated with a native component 214. For example, if a user zooms in on the digital canvas, the properties of the add-on are indirectly adjusted (e.g., without user intervention) such that the add-on is resized to account for zooming in on the digital canvas. In these cases, at numeral the authoring engine 222 passes the modification of the native component 214 and other information (such as the user event data, a routine identifier, etc.) to the iframe object 224. As described herein, the iframe object 224 may be a global object of the DOM that describes the iframe 206 including content of the iframe such as a state of the iframe, attributes of the iframe (color, position, orientation, opacity, etc.), and the like. The iframe object 224 maintains the iframe 206 data that is synchronized across instances of an iframe 206 across all web applications.

After one or more properties of the iframe object 224 have been adjusted, the iframe object 224 passes the adjustments as CSS transformations (or other transformations), to the iframe component manager 212 at numeral 6. As described herein, the iframe component manager 212 links the iframe 206 displayed on the web application to the DOM of the web application. Accordingly, at numeral 7, the iframe component manager 212 passes such CSS transformations (or other transformations) to the iframe UI component 204 (and/or the iframe 206) to translate one or more properties of the iframe. For instance, in the zoom example, the size of the iframe 206 displayed in the web application is increased or decreased depending on whether the user zoomed in, or zoomed out of the web application using native components 214.

As the web application is manipulated (e.g., scrolling down a page), native objects are re-rendered (or updated) using a browser executed renderer, such as WebGL. Although the iframe 206 is rendered using the web browser (e.g., an iframe renderer) and not rendered the same way as the digital canvas (or other native objects of the native application), the iframe 206 scrolls with the digital canvas such that the iframe 206 appears that it is moving with the native objects of the web application. This is because the iframe 206 (and/or the iframe UI component 204) is receiving CSS transforms or other modifications responsive to the manipulations of the native component 214.

Figure 5:
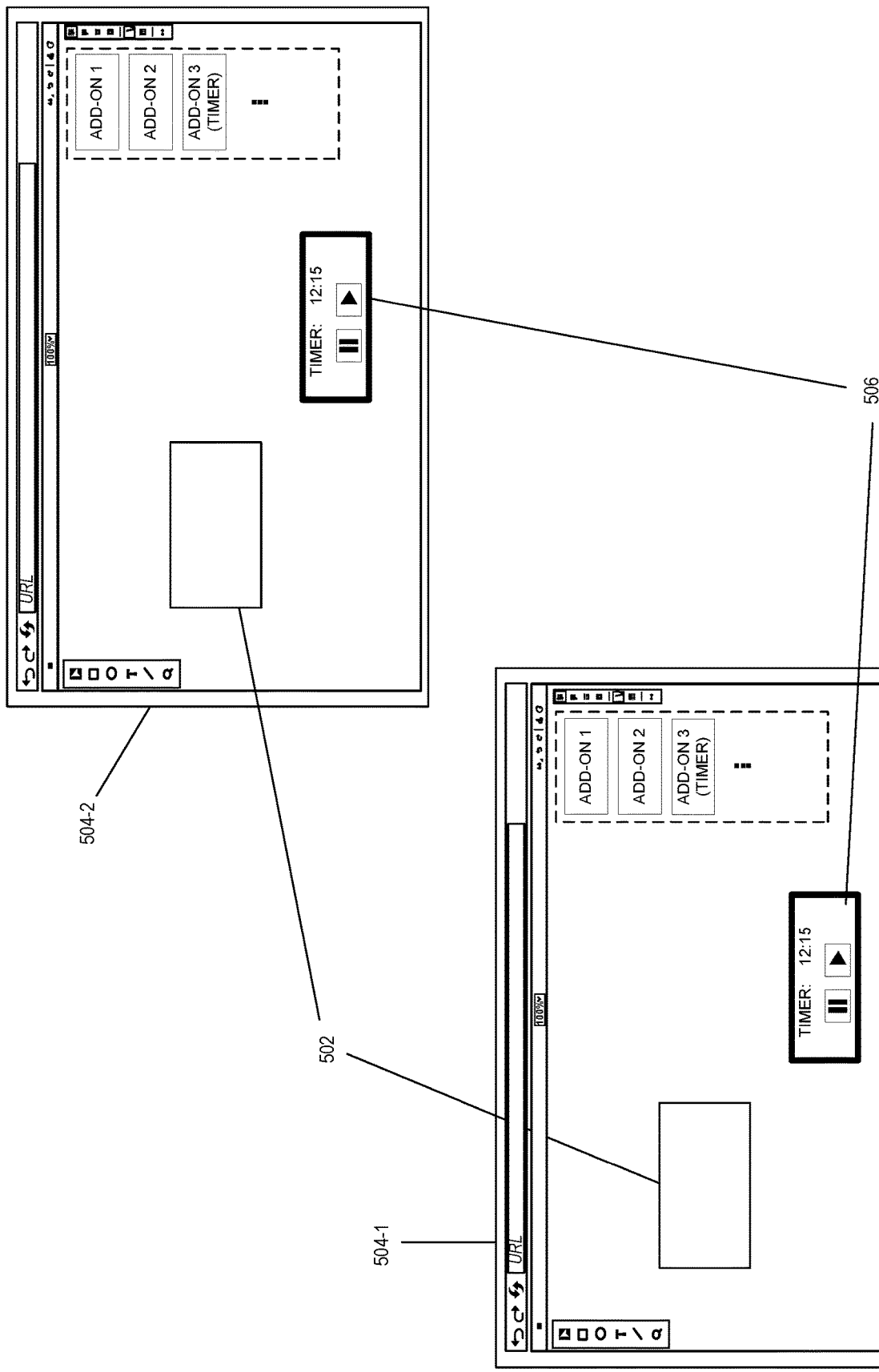
FIG. 5 illustrates another example execution of a web application, in accordance with one or more embodiments.

FIG. 5 illustrates another example execution of a web application, in accordance with one or more embodiments. The native application is executed in two instances, 504-1 and 504-2. Each instance of the native application may be displayed on separate computing devices. For example, the native application (and any non-native applications) may be displayed on separate user interfaces of separate computing devices. Each non-native application displayed on the separate user interfaces is executed using iframes of the separate user interfaces. Alternatively, each instance of the native application may be displayed on the same computing device (if a different user is logged in to each instance).

Synchronization of the native application (and non-native applications) across instances (e.g., native application instance 504-1 and native application instance 504-2) is possible as a result of the objects maintained in the DOM. The web application platform 100 synchronizes the DOM of a web application across any instances of the web application. So, if multiple web applications are open on different computing devices, (or multiple web applications are open on the same computing device with different users), the DOMs are synchronized using the web application platform 100. In this manner, content and attributes (color, size, position, shape, etc.) of non-native applications are matched across different native application instances.

For example, a display of a web application on the native application instance 504-1 on a first computing device appears visually similar to a display of a web application of the native application 504-2 on a second computing device. As shown in FIG. 5, a timer 506 initiated at native application 504-1 is also initiated in native application 504-2. Similarly, the native object 502 is similarly positioned (and is the same size, color, opacity, etc.) in both native application instance 504-1 and 504-2. In operation, the DOM synchronizes properties of native objects and non-native objects such that state information (e.g., content) and attributes of the native objects and/or non-native objects are synchronized or otherwise reflected similarly (e.g., matching) in each instance of the web application.

Figure 6:
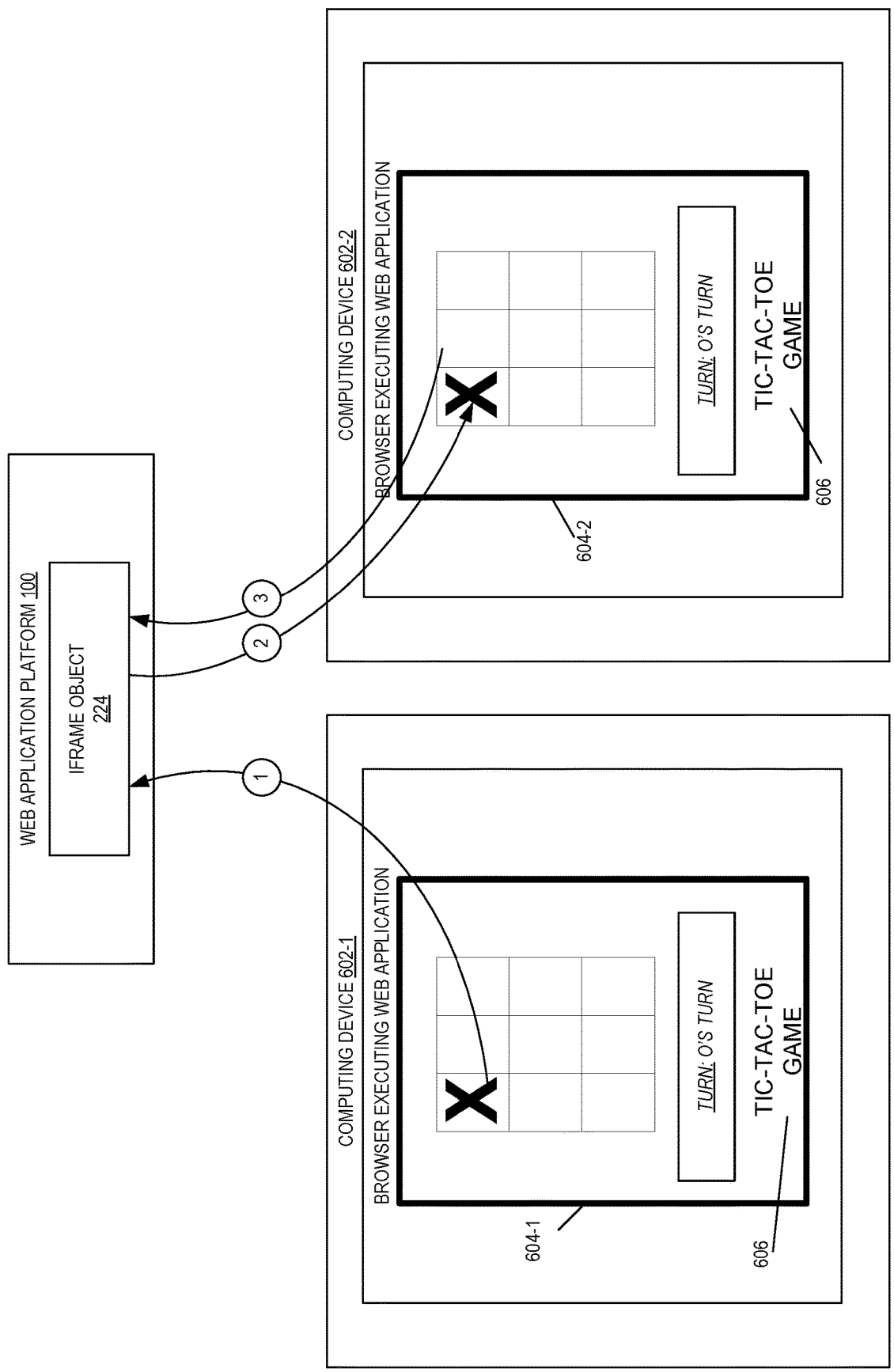
FIG. 6 illustrates a diagram of a process of synchronizing non-native applications across instances of a native application, in accordance with one or more embodiments.

FIG. 6 illustrates a diagram of a process of synchronizing non-native applications across instances of a native application, in accordance with one or more embodiments. As shown, two computing devices 602-1 and 602-2 are executing a web application using a browser. The web application is running native application script of the web application platform 100.

As shown, the functionality of the native application is extended using a non-native tic-tac-toe application 606. The same non-native tic-tac-toe application 606 is displayed on each computing device 602-1 and 602-2 using an iframe of each browser. For example, the browser executing the native application on computing device 602-1 uses iframe 604-1 to execute non-native application 606. Similarly, the browser executing the native application on computing device 602-1 uses iframe 604-2 to execute non-native application (e.g., tic-tac-toe application 606). When the non-native tic-tac-toe application 606 was initiated (at either computing device), a corresponding counter object was allocated in the DOM. The corresponding counter object, as described herein, is the global iframe object 224 maintained by the DOM.

At numeral 1, a user using computing device 602-1 interacts with the non-native tic-tac-toe application 606, making a move "X" in the game. As described herein, the iframe UI component, iframe component manager, native UI component handler, native component handler, and authoring engine process the move at the computing device 602-1. As a result of such processing (e.g., passing the user event data to the DOM of the web application), the iframe object 224 is updated with content of (e.g., the move "X" in the game). Moreover, iframe 604-1 is updated to display the move "X" in the game. As described herein, the iframe object 224 updates the iframe component manager and the iframe UI component to display and render the "X" in the tic-tac-toe application 606.

At numeral 2, responsive to content of the iframe object 224 updating, (e.g., the move "X" in the game), the iframe object 224 updates the iframe component manager and the iframe UI component. In this manner, iframe 604-2 of the computing device 602 is updated to indicate the move "X." In other words, a state of the iframe 604-1 displayed on computing device 602-1 is passed to iframe 604-2 displaying on computing device 602-1 using the iframe object 224 of the DOM of the web application. In this manner, the computing device 602-2 displays the updated content associated with the tic-tac-toe application 606 based on the user event (the interaction with iframe 604-1) at computing device 602-1.

At numeral 3, the user clicks on an adjacent cell to make an "O" move in the tic-tac-toe application. As described herein, the iframe UI component, iframe component manager, native UI component handler, native component handler, and authoring engine process the user event at the computing device 602-1.

As shown in FIG. 6, states of the non-native application (e.g., moves made in the tic-tac-toe application 606) are maintained in the non-native application object of the DOM. In addition, other attributes of the non-native application may be maintained by the DOM. For example, the non-native application of the DOM maintains color, position in the digital canvas, size, etc. of a non-native application. In this manner, if an attribute of the non-native application is adjusted in one instance of the native application (e.g., at computing device 602-1), a corresponding attribute of other non-native applications are adjusted in each of the other instances of the native application (e.g., the web application displayed on other computing devices such as computing device 602-2).

For example, a global iframe object (e.g., iframe object 224) may be updated in a first instance of a native application. For instance, a user may adjust a property of the non-native application. As a result, the global iframe stores the adjusted property of the non-native application. CSS transformations (or other transformations) are passed to the iframe in every instance of the web application to adjust the property of the non-native application in web application.

In operation, the non-native application object of the DOM (e.g., iframe object 224, as described herein) passes a transform to each non-native application in other instances, and specifically, to each iframe executing non-native applications in other native application instances. In this manner, stylistic modifications (or other modifications) to non-native applications in other native application instances are implemented responsive to a stylistic modification to a non-native application in a first native application instance.

Figure 7:
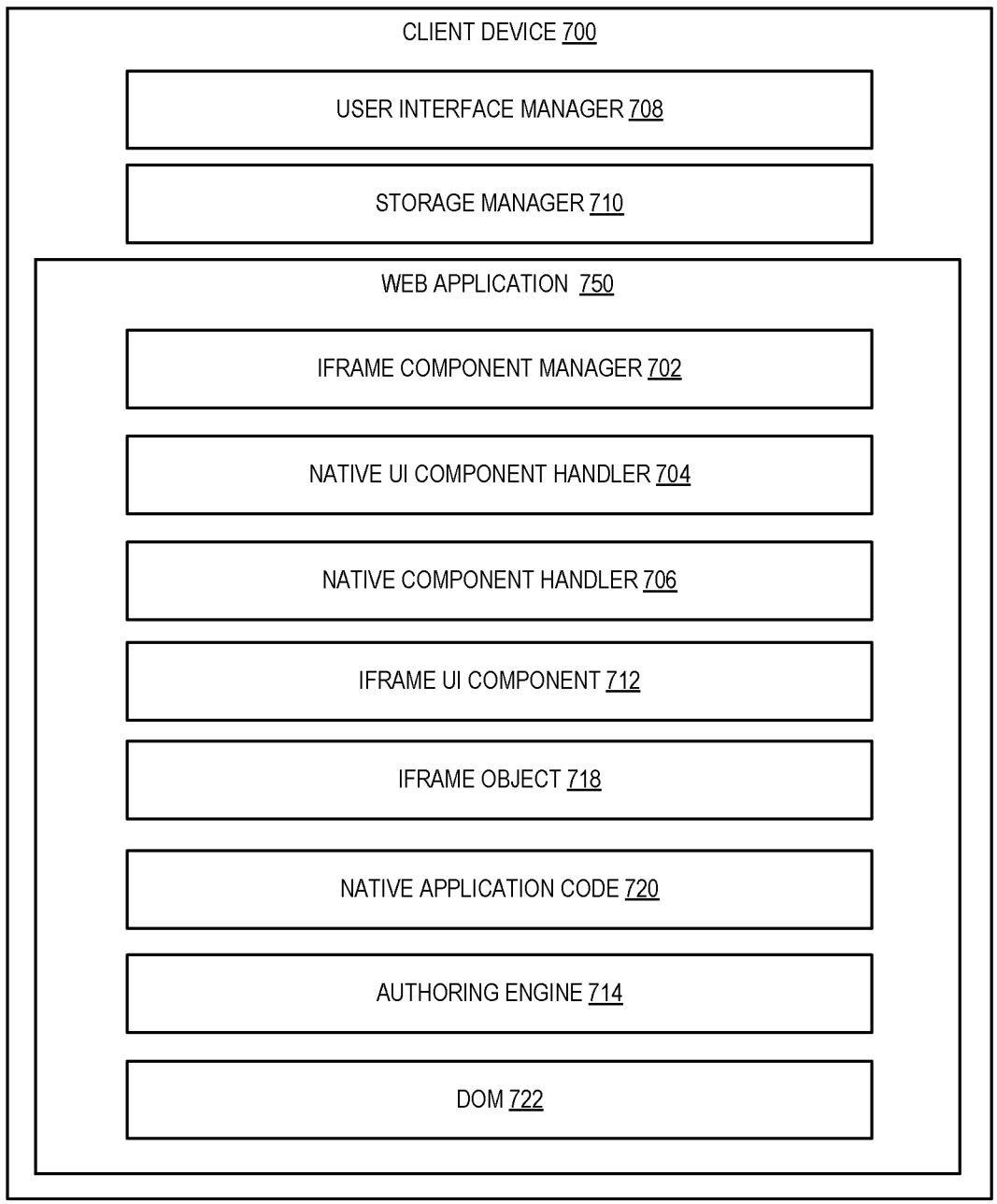
FIG. 7 illustrates a schematic diagram of a web application supporting interactive objects in a document object model that are rendered using HTML elements, in accordance with one or more embodiments.

FIG. 7 illustrates a schematic diagram of a web application supporting interactive objects in a document object model that are rendered using HTML elements, in accordance with one or more embodiments. As shown, a client device 700 (or other computing system) may include, but is not limited to, a user interface manager 708, and a storage manager 710. The client device 700 is configured to display and/or execute, in part, web application 750. For example, using a web browser of the client device 700, the web application 750 is executed. The web application 750 includes an iframe component manager 702, a native UI component handler 704, a native component handler 706, an iframe UI component 712, an authoring thread 714, an iframe object 718, a DOM 722, and native application code 720.

The client device 700 includes a user interface manager 708. The user interface manager 708 facilitates the generation and display of content within a user interface of one or more applications on the client device 700. Additionally, the user interface manager 708 allows a user to view and/or interact with digital content displayed on a user interface. The user interface manager 708 can thus receive user inputs such as a mouse click, a mouse hover, a mouse compression, a mouse decompression, a haptic interaction, a key press, and the like. The user inputs are used to interact with a digital canvas of a web application 750 by adding objects to the digital canvas (including native and non-native objects), adjusting a position of the object, adjusting a size of the object, executing the functionality of the object, and the like.

The user inputs captured by the user interface manager 708 are recognized by the web application 750. As described herein, if the user inputs are directed to native objects of the web application 750, the native UI component handler 704 recognizes the user inputs. If the user inputs are directed to non-native objects of the web application 750, the iframe UI component 712 recognizes the user inputs. This is because the iframe is executed as an HTML, element above the web application 750. Accordingly, user inputs directed to the iframe are not captured by standard techniques used to capture user inputs at the web application layer.

As described above, a user input is passed from components of the user interface thread of the web application 750 (e.g., iframe UI component 712, iframe component manager 702, and native UI component handler 704) to components in an authoring thread of the web application 750 (e.g., native component handler 706, and iframe object 718). As described herein, the user interface thread manages and processes such instructions and operations associated with the user interface. For example, the user interface thread receives inputs from the user interface manager 708. The authoring thread manages and processes such instructions and operations associated with the creation and execution of the web application 750. All of the processing of the DOM 722 of the web application 750 occurs in the authoring thread. The DOM 722 is loaded into the browser such that the browser can execute and display the contents of the web application 750.

In particular, the iframe UI component 712 passes user inputs associated with an iframe to the iframe component manager 702. The iframe component manager 702 is a native object of the web application 750 (sometimes referred to herein as a blank native element) that is not rendered. Instead, the iframe component manager 702 links an iframe to the DOM 722. Specifically, the iframe component manager 702 passes coordinates of the position of the iframe obtained from the iframe UI component 712 to the iframe object 718 of the DOM 722. Additionally or alternatively, the iframe component manager 702 receives non-native application content (e.g., a state of the non-native application). The native UI component handler 704 manages events by passing such events to the native component handler 706 in the authoring thread. The authoring engine 714 of the authoring thread executes routines/defined behaviors based on user interactions of native and/or non-native content.

The web application 750, also includes native application code 720. Native application code 720 is any code configured to execute the web application 750. As described herein, the web application 750 is executed via the client device 700 using a web browser.

The iframe object 718 is a global data object of the DOM 722 that describes the iframe including content of the iframe such as a state of the iframe, attributes of the iframe (color, position, orientation, opacity, etc.), and the like. Each time iframe content is updated and/or one or more iframe attributes are updated, the iframe object 718 is also updated. The iframe object 718 is used to pass updated contents and/or iframe property adjustments to the user interface thread using the iframe component manager 702. As described herein, the iframe component manager 702 links the iframe displayed on the web application 750 to the DOM 722. Accordingly, the iframe component manager 702 passes such contents and/or iframe property adjustments to the iframe UI component 712 (and/or the iframe) to be displayed to a user using the user interface manager 708.

As illustrated in FIG. 7, the client device 700 also includes the storage manager 710. The storage manager 710 maintains data for the client device 700. The storage manager 710 can maintain data of any type, size, or kind as necessary to perform the functions of the client device 700. In some implementations, the storage manager 710 caches client device information (e.g., IP address, credentials, etc.). Such client device information may be used during the initiation/execution of the web application 750. Similarly, the storage manager 710 caches user information (e.g., name, address, profile information, etc.) and such user information may be used during the initiation/execution of the web application 750.

Each of the components of the client device 700 may be in communication with one another using any suitable communication technologies. It will be recognized that although the components are shown to be separate in FIG. 7, any of the components may be combined into fewer components, such as into a single facility or module, divided into more components, or configured into different components as may serve a particular embodiment.

The components of the client device 700 and their corresponding elements can comprise software, hardware, or both. For example, the user interface manager 708 and the storage manager 710 can comprise one or more instructions stored on a computer-readable storage medium and executable by processors of one or more computing devices. When executed by the one or more processors, the computer-executable instructions of the client device 700 can cause the client device 700 and/or a server device to perform the methods described herein. Alternatively, the components of the client device 700 and their corresponding elements can comprise hardware, such as a special purpose processing device to perform a certain function or group of functions. Additionally, the components of the client device 700 can comprise a combination of computer-executable instructions and hardware.

Furthermore, the components of the client device 700 may, for example, be implemented as one or more stand-alone applications, as one or more modules of an application, as one or more plug-ins, as one or more library functions or functions that may be called by other applications, and/or as a cloud-computing model. For example, the web application 750 may be implemented as a stand-alone application, such as a desktop or mobile application. Furthermore, as described herein, the web application 750 may be implemented as one or more web-based applications hosted on a remote server. Alternatively, or additionally, the web application 750 may be implemented in a suite of mobile device applications or "apps."

Figure 8:
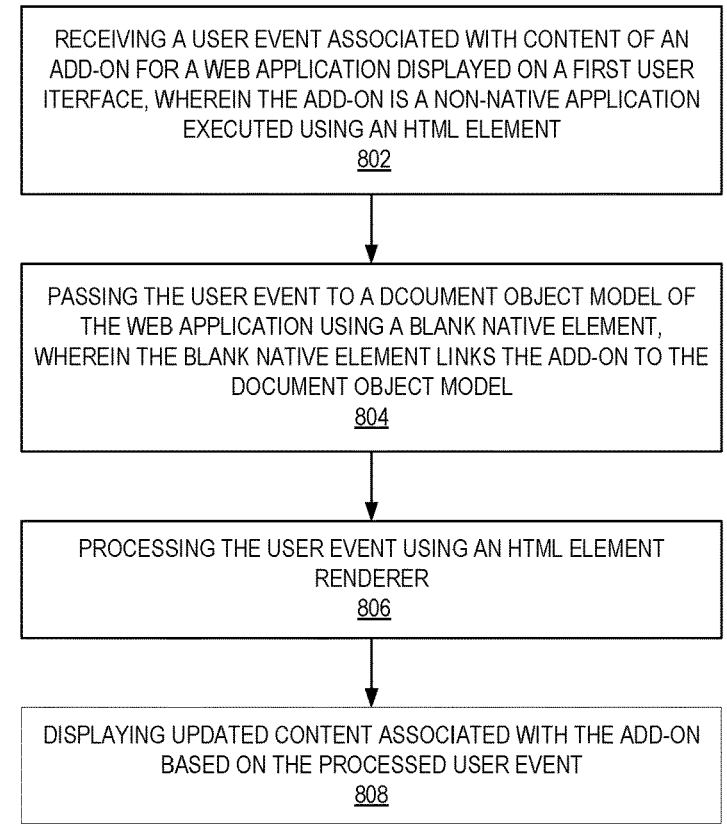
FIG. 8 illustrates a flowchart of a series of acts in a method of deploying a web application supporting interactive objects in a document object model that are rendered using HTML, elements, in accordance with one or more embodiments.

FIGS. 1-7, the corresponding text, and the examples, provide a number of different systems and devices that allows a user to access non-native applications using an iframe of a native application. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of deploying a web application supporting interactive objects in a document object model that are rendered using HTML elements, in accordance with one or more embodiments. In one or more embodiments, the method 800 is performed in a digital medium environment that includes the client device 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving a user event associated with content of an add-on for a web application displayed on a first user interface. The add-on is a non-native application executed using an iframe. As described herein, application data for a web application is delivered to a browser via the internet. Application data can include HTML descriptions of the content to be rendered on the application (and specifically, a web page of the application), CSS information dictating the layout/structure of the HTML data, and javascript data, which enables dynamic content of the web application. The application data is organized using a DOM such that the browser can render one or more portions of the application data.

The user may initiate a non-native application (e.g., add-on) of the web application (e.g., the native application) by interacting with a control panel or otherwise indicating a user's desire to execute the non-native application.

Responsive to such indication of the user's desire to execute the add-on (e.g., dragging an add-on to the digital canvas, selecting an add-on application from a list of add-ons, etc.), an iframe is created. An iframe is an HTML element that runs code within a web page. The iframe can run HTML, javascript, CSS, and the like. As described herein, the iframe runs the script to execute functionality of the add-on in the web application.

As illustrated in FIG. 8, the method 800 includes an act 804 of passing the user event to a document object model of the web application using a blank native element, wherein the blank native element links the add-on to the document object model. As described herein, an iframe UI component collects user events associated with the iframe, determines a position (and/or orientation) of the iframe in the digital canvas, and the like. The iframe UI component listens for user events associated with one or more executed iframes because the iframe is an HTML element above the digital canvas. As a result, a native UI component handler does not detect user events associated with the digital canvas underlying the iframe. Therefore, the iframe UI component is configured to recognize user events associated with an iframe and pass such user events to an iframe component manager.

The iframe component manager is a native object of the web application (sometimes referred to herein as a blank native element) that is not rendered. In effect, it is an invisible space in the web application that is allocated to one or more iframes (e.g., a specific non-native application). The iframe component manager is a native object of the web application that links an iframe to the DOM of the web application. Data collected by the iframe UI component is used to map (or otherwise correlate) a position of the iframe in the user interface to the web application using the iframe component manager. Specifically, the iframe component manager passes coordinates of the position of the iframe obtained from the iframe UI component to an iframe object of the DOM (using the native UI component handler, a native component handler, and the authoring engine). In this manner, the DOM becomes aware of the position of the iframe in the web application.

As illustrated in FIG. 8, the method 800 includes an act 806 of processing the user event using an iframe renderer. As described herein, when an iframe is created, the browser creates an HTML environment to render the content of the iframe. That is, in contrast to the rending of native objects rendered using WebGL, the iframe content is rendered using the browsers (e.g., using the HTML environment).

As illustrated in FIG. 8, the method 800 includes an act 806 of displaying updated content associated with the add-on based on the processed user event. As described herein, an iframe object is a global data object of the DOM that describes the iframe including content of the iframe such as a state of the iframe, attributes of the iframe (color, position, orientation, opacity, etc.), and the like. In an example, a user event may adjust a property of the iframe (e.g., the size of the iframe). Accordingly, the iframe object stores and maintains such adjustments to the property. Similarly, content of the iframe may be adjusted (e.g., a timer add-on is initiated, a turn in an interactive game is played, etc.). Accordingly, the iframe object stores and maintains content associated with the iframe.

After one or more properties of the iframe object have been adjusted, and/or content of the iframe object has been updated, the iframe object passes the adjustments, as CSS transformations (or other transformations), to the iframe component manager. As described herein, CSS is used to adjust the layout/structure of objects of an application. Therefore, as a result of a user event, CSS transforms representing stylistic modifications (or other visual modifications) are applied to the iframe. For example, a user zooming in on a timer application would result in the size of the timer being increased. Such resizing may be defined according to CSS transforms based on the user event (the user zooming in on the timer application).

As described herein, the iframe component manager links the iframe displayed on the web application to the DOM of the web application. Accordingly, the iframe component manager passes such CSS transformations (or other transformations) received from the DOM to the iframe UI component (and/or the iframe) to translate one or more properties of the iframe. In this manner, transformations from the DOM are passed to the iframe. Accordingly, such adjusted iframe properties and/or iframe content is displayed to a user via the iframe.

Figure 9:
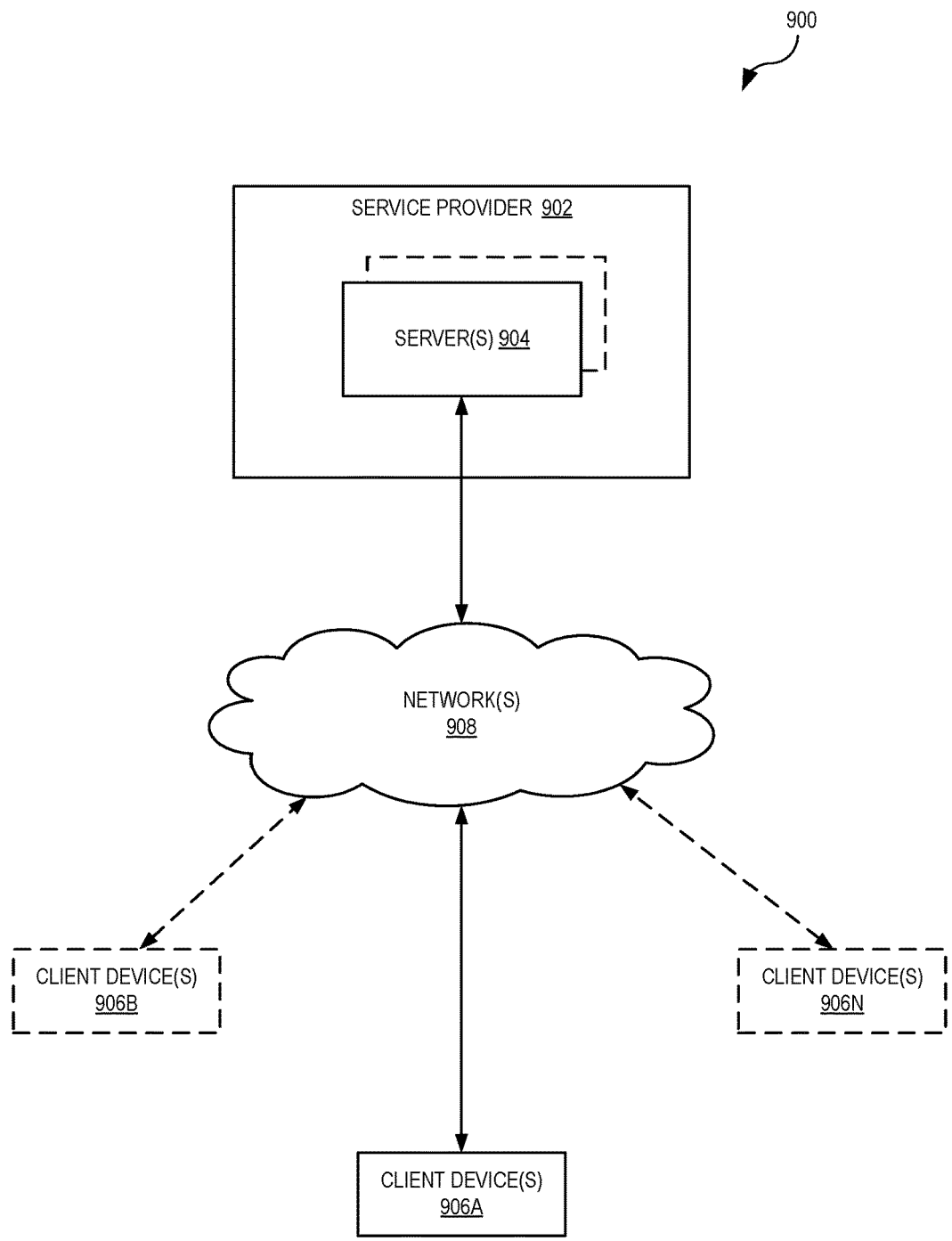
FIG. 9 illustrates a schematic diagram of an exemplary environment in which an example client device can operate in accordance with one or more embodiments.

FIG. 9 illustrates a schematic diagram of an exemplary environment 900 in which the an example client device can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device. In particular, the web application 750 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data, including iframe objects 718, native application code 720, or other information. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the web application 750 such as web application platform. In particular, the web application 750 can comprise an application running on the one or more servers 904 or a portion of the web application 750 can be downloaded from the one or more servers 904. For example, the web application 750 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or web site hosted at the one or more servers 904.

For example, upon the client device accessing a webpage or other web application hosted at the one or more servers (via a web application platform, for instance), in one or more embodiments, the one or more servers can provide access to a user interface displayed at a client device providing a user access to a native application. The client device allows the user to interact with the native application, communicating one or more interactions with the native application to the one or more servers. Upon receiving the communication, the one or more servers can automatically perform the methods and processes described above to synchronize content (including non-native applications executed via the native application) with one or more instances of the web application hosted at the one or more servers.

The web application 750 may be implemented in whole, or in part, by the individual elements 902-908 of the environment 900. It will be appreciated that although certain components of the web application 750 are described in the previous examples with regard to particular elements of the environment 900, various alternative implementations are possible. For instance, in one or more embodiments, the web application 720 is implemented on any of the client devices 906A-N. Similarly, in one or more embodiments, the web 750 may be implemented on the one or more servers 904. Moreover, different components and functions of the web application 750 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
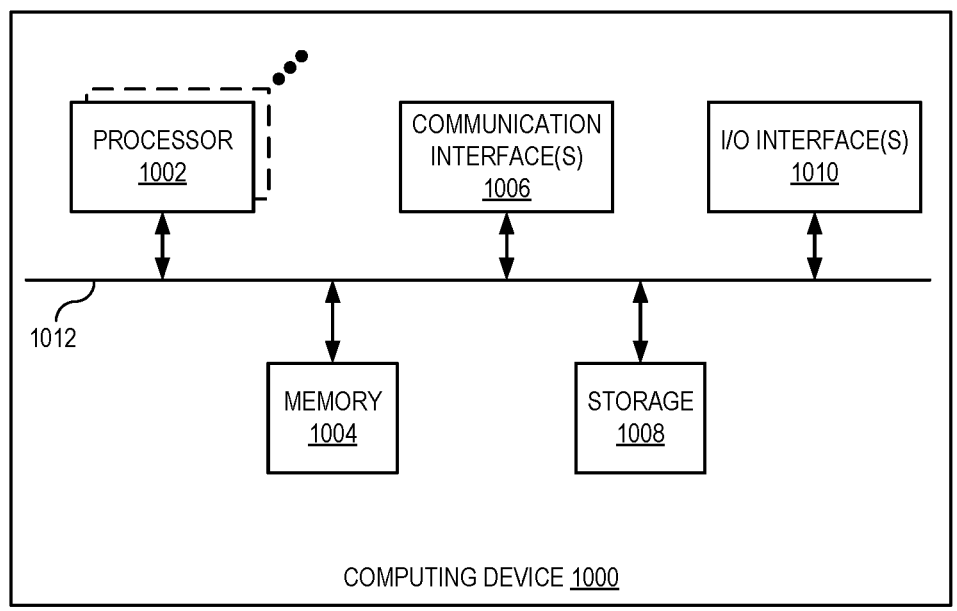
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the web application. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
    receiving a user event associated with content of an add-on for a web application displayed on a first user interface, wherein the add-on is a non-native application executed using a hypertext markup language (HTML) element;
    passing the user event to a document object model of the web application using a blank native element, wherein the blank native element links the add-on to the document object model;
    processing the user event using an HTML element renderer; and
    displaying updated content associated with the add-on based on the processed user event.

2. The method of claim 1, further comprising:
    receiving a selection of the add-on to be added to a digital canvas of the web application.

3. The method of claim 1, further comprising:
    passing a transform from the document object model to the HTML element, wherein the transform represents a stylistic modification to the HTML element responsive to the user event.

4. The method of claim 1, further comprising:
    displaying the add-on of the web application on a second user interface using a second HTML element, wherein the second HTML element executes the non-native application displayed on the second user interface; and
    synchronizing the add-on of the web application on the second user interface using the document object model.

5. The method of claim 4, wherein synchronizing the add-on of the web application on the second user interface using the document object model further comprises:
    passing a transform from the document object model to the second HTML element, wherein the transform represents a stylistic modification to the second HTML element responsive to the user event.

6. The method of claim 4, wherein synchronizing the add-on of the web application on the second user interface using the document object model further comprises:
    passing a state of the HTML element displayed on the first user interface to the second HTML element displayed on the second user interface using the document object model.

7. The method of claim 4, wherein synchronizing the add-on of the web application on the second user interface using the document object model further comprises:
    displaying the updated content associated with the add-on based on the processed user event on the second user interface.

8. The method of claim 4, wherein the first user interface executes on a first client device and the second user interface executes on a second client device, and wherein the synchronization of the add-on of the web application on the second user interface comprises matching the add-on displayed on the first user interface executed on the first client device and the add-on displayed on the second user interface executed on the second client device.

9. The method of claim 1, wherein the user event is an interaction with the HTML element.

10. The method of claim 9, wherein the interaction is at least one of: a mouse click, a mouse hover, a mouse compression, a mouse decompression, a haptic interaction, or a key press.

11. The method of claim 1, wherein each HTML element of one or more HTML elements executes a non-native application isolated from a native application.

12. The method of claim 11, wherein isolation from the native application includes execution of a non-native application script and storage of one or more objects of the non-native application in a data object.

13. A non-transitory computer-readable medium storing executable instructions that, when executed by a processor, cause the processor to:
    receive a user event associated with content of an add-on for a web application displayed on a first user interface, wherein the add-on is a non-native application executed using a hypertext markup language (HTML) element;
    pass the user event to a document object model of the web application using a blank native element, wherein the blank native element links the add-on to the document object model;
    process the user event using an HTML element renderer; and
    display updated content associated with the add-on based on the processed user event.

14. The non-transitory computer-readable medium of claim 13, storing instructions that further cause the processor to:
    receive a selection of the add-on to be added to a digital canvas of the web application.

15. The non-transitory computer-readable medium of claim 13, storing instructions that further cause the processor to:
    pass a transform from the document object model to the HTML element, wherein the transform represents a stylistic modification to the HTML element responsive to the user event.

16. The non-transitory computer-readable medium of claim 13, storing instructions that further cause the processor to:
    display the add-on of the web application on a second user interface using a second HTML element, wherein the second HTML element executes the non-native application displayed on the second user interface; and
    synchronize the add-on of the web application on the second user interface using the document object model.

17. A system comprising:
a memory component; and
a processing device coupled to the memory component, the processing device to perform operations comprising:
  receiving a request to execute a user selected add-on to be added to a digital canvas displayed on a user interface of a web application, wherein the add-on is executed using an HTML element;
  allocating a data object in a document object model for the add-on; and
  allocating a blank native element in the user interface to pass one or more user events to the data object.

18. The system of claim 17, wherein the processing device is further configured to perform operations comprising:
receiving a user event associated with content of the add-on.

19. The system of claim 17, wherein the processing device is further configured to perform operations comprising:
mapping a position of the add-on on the user interface displaying the digital canvas to the digital canvas by passing coordinates of the position of the add-on obtained by the blank native element to the data object in the document object model.

20. The system of claim 17, wherein the data object maintains one or more attributes of the HTML element.

* * * * *